United States Patent
Bustamante et al.

(10) Patent No.: US 7,555,822 B2
(45) Date of Patent: Jul. 7, 2009

(54) LASER GENERATION OF THERMAL INSULATION BLANKET

(75) Inventors: Anthony T Bustamante, Sterling Heights, MI (US); Chris Chappell, W. Bloomfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 630 days.

(21) Appl. No.: 11/099,154

(22) Filed: Apr. 5, 2005

(65) Prior Publication Data

US 2006/0218770 A1    Oct. 5, 2006

(51) Int. Cl.
*B21B 1/46* (2006.01)
*C23C 14/14* (2006.01)

(52) U.S. Cl. .................... 29/527.2; 427/597
(58) Field of Classification Search ............. 29/527.2, 29/525.13, 525.14; 427/597

See application file for complete search history.

(56) References Cited

U.S. PATENT DOCUMENTS 6,554,854 B1 * 4/2003 Flanagan .................. 623/1.1

OTHER PUBLICATIONS

Technical Support Package, Thin Thermal-Insulation Blankets for Very High Temperatures, NASA Tech Briefs, GSC-14386-1, pp. 1-5, Jun. 29, 2000.

* cited by examiner

*Primary Examiner*—John C Hong
(74) *Attorney, Agent, or Firm*—Ralph E. Smith

(57) ABSTRACT

A themial insulation method for an internal surface of an injection molding casting die includes forming a thermal insulation blanket on the internal surface using laser cladding. One or more layers of a metal material having suitable thermal emittance and melting point characteristics is applied to the internal surface using laser cladding. Because the impact area of the injected molten metal is subject to greater stress and temperature gradients than the remainder of the surface, laser cladding can be used to apply the thermal insulation blanket only to areas that require additional protection.

3 Claims, 1 Drawing Sheet

LASER GENERATION OF THERMAL INSULATION BLANKET

FIELD OF THE INVENTION

The present invention relates to laser cladding, and more particularly to applying thermal insulation to casting dies using laser cladding.

BACKGROUND OF THE INVENTION

Thermal shock caused by the injection of molten material, such as aluminum, into a casting die may lead to an early failure of the die. The thermal shock is a result of an extremely rapid change of temperature due to the high temperature of the molten material. A hydraulic press is used to exert pressure on the die in order to keep the die closed during the injection process. Typically, the failure occurs in the entrance or gate area of the die. After repeated injection, cracks begin to form in the surface of the die in the impact area. For example, cracks caused by thermal stress originate at the surface of the die, and gradually progress into the substrate until failure of the die occurs.

As subsequent parts are formed in the die, molten aluminum may fill the cracks during the injection process. When the molten aluminum solidifies to form the part, the part may adhere within the cracks. Therefore, the part may be damaged upon removal from the die. Additionally, excess aluminum may be retained in the die, further hindering subsequent part formation.

SUMMARY OF THE INVENTION

A thermal insulation method for an internal surface of an injection molding casting die comprises forming at least one carbon-carbon mesh layer on the internal surface. At least one metal material having a thermal emittance that is approximately equal to or less than 0.25 and a melting point that is greater than 1000° C. is selected. At least one outer layer is formed with the at least one metal material on the internal surface using laser cladding. The at least one carbon-carbon mesh layer is located between the at least one outer layer and the internal surface.

In another aspect of the invention, a thermal insulation method for an internal surface of an injection molding casting die comprises selecting at least one metal material having a thermal emittance that is approximately equal to or less than 0.25 and a melting point that is greater than 1000° C. A first thermal insulation layer is formed with the at least one metal material on the internal surface using laser cladding. An area of the first thermal insulation layer is substantially equal to an area of the internal surface. An impact point for injection molding is determined on the internal surface. A location of the first thermal insulation layer that corresponds to the impact point is determined. A second thermal insulation layer is formed with the at least one metal material at the corresponding location using laser cladding. An area of the second thermal insulation layer is less than the area of the first thermal insulation layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

The present invention proposes forming a thermal insulation blanket on the surface of the die using laser cladding. Laser cladding is used to deposit material on part surfaces, resulting in a coating that is metallurgically bonded to the surface. Metal material that is applied via laser cladding provides enhanced corrosion, abrasion, and wear resistance. More specifically, a thermal insulation blanket formed on the surface of the die isolates the die from the extreme temperature gradient caused by the injection of molten material.

Using laser cladding, a laser beam is used to apply a film of a first metal material to the surface of a second metal material. The first metal material is applied to the surface as the laser is focused at an impact point on the surface. The laser immediately vaporizes the first metal material, resulting in a thin film bonded to the surface. Laser cladding requires a relatively low heat input, so distortion, as well as the heat-affected zone of the second metal material, is minimized. The microstructure of the resulting film is typically finer, harder, and more corrosion resistant compared to materials applied using other processes. Additionally, the film is metallurgically bonded to the second metal material.

Figure 1:
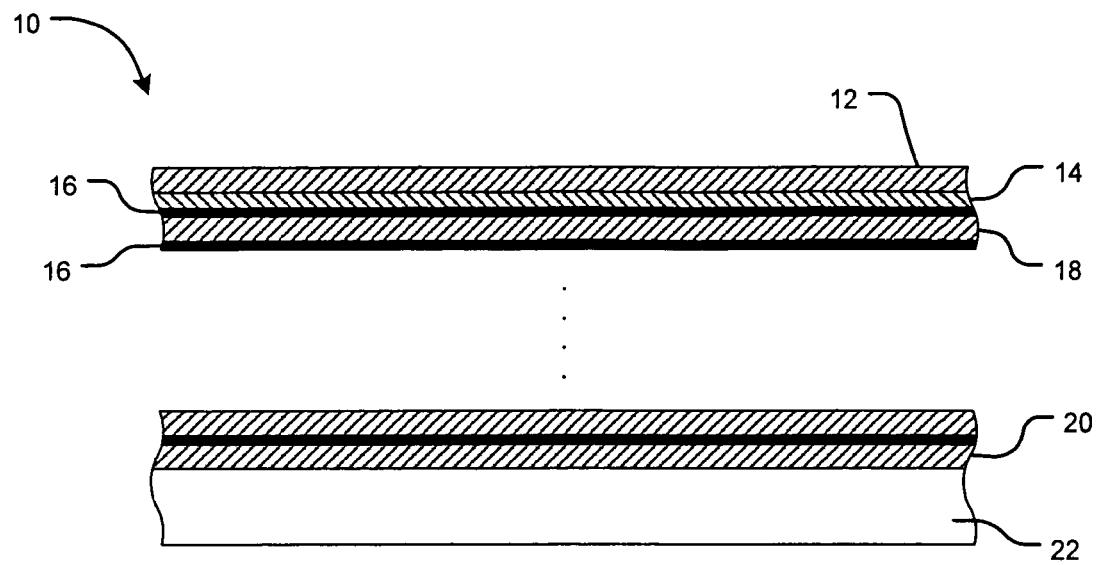
FIG. 1 is cross-sectional view of an exemplary thermal insulation blanket according to the prior art.

The present invention uses laser cladding to apply one or more thin layers of material to the internal surface of a die to act as a thermal insulation layer between the injected molten material and the die. The thermal insulation layer, or blanket, does not transfer the heat from the molten material into the die, protecting the die from the severe temperature gradient. An exemplary thermal insulation blanket 10 is shown in FIG. 1. Several layers of highly heat-resistant materials form the thermal insulation blanket 10. For example, an outer layer 12 of molybdenum includes a titanium nitride backing 14. A carbon-carbon composite mesh layer 16 separates the outer layer 12 from one or more inner layers 18 of molybdenum or titanium nitride or a combination of both. Additional carbon-carbon composite mesh layers 16 are interlaced between each molybdenum inner layer 18. An inner cover layer 20 of molybdenum or titanium nitride or a combination of both separates the thermal insulation blanket 10 from a substrate 22.

Although other suitable materials may be used to form the thermal insulation blanket 10, it should be understood that a low thermal emittance is desirable in order to avoid transferring heat from the thermal insulation blanket 10 into the substrate 22. Thermal emittance is the ability of a material to release absorbed heat. For example, the thermal emittance of molybdenum is 0.24. The thermal emittance of titanium nitride is 0.03. High melting points for the materials is desirable. The melting point of molybdenum is 2,610° C. The melting point of titanium nitride is 2,930° C. The melting point of carbon-carbon is 2,130° C. Therefore, the overall melting point of the thermal insulation blanket 10 is high enough to withstand the extreme temperatures of injection molding without transferring heat to the underlying substrate. For the purposes of the present invention, a melting point of at least 1,000° C. is desirable.

Figure 2:
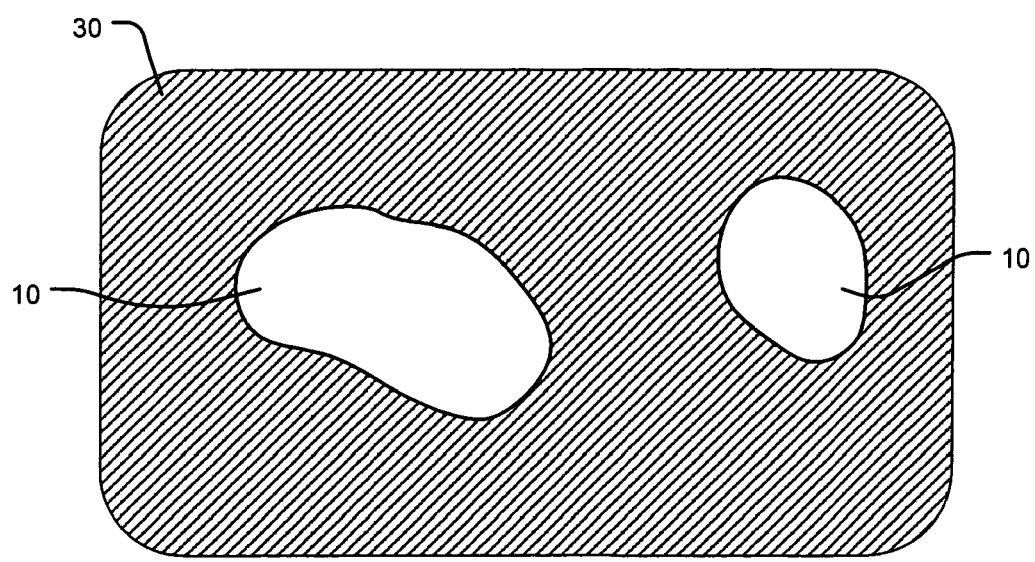
FIG. 2 illustrates a thermal insulation blanket applied to a casting die substrate according to the present invention.

Thermal insulation blankets 10 are applied to a casting die substrate 30 as shown in FIG. 2. Multiple layers of one or more suitable interlaced materials may be applied to form the thermal insulation blankets 10 as described in FIG. 1. For example, the casting die substrate 30 is typically steel. The injected molten aluminum tends to have an affinity for the steel, resulting in a buildup of aluminum bonded to the steel over time. The use of molybdenum isolates the aluminum from the steel, reducing this effect. The strength of titanium nitride allows the casting die substrate to resist the effects of the repeated impact caused by injection molding, such as gradual erosion of the substrate. Additionally, a single layer of a suitable material may be used to form the thermal insulation blankets 10. Laser cladding allows the materials to be applied to the casting die substrate 30 in extremely thin, smooth layers. For example, the thermal insulation blankets 10 may be less than 5 mils thick. However, in order for the thermal insulation blankets 10 to provide adequate isolation from the injected molten material, the thermal insulation blankets of the preferred embodiment are approximately 1 mm thick. In this manner, the thermal insulation blankets 10 provide increased resistance to the thermal gradient and repeated impact, but are thin enough to have little effect on the shape of the part being molded. In some circumstances it can be seen that the presence of one or more thermal insulation blankets may have an effect on the shape of the part. If a single thermal insulation blanket 10 is applied to the entire surface of the casting die substrate 30, then the entire surface of the part will be reduced by the thickness of the thermal insulation blanket 10. Therefore3 the design of the part anchor the casting die may take the thickness of the thermal insulation blanket 10 into consideration. For example, the entire surface of the casting die substrate 30 may be offset by the thickness of the thermal insulation blanket 10. Alternatively1 if one or more separate thermal insulation blankets 10 are used as shown in FIG. 2, the casting die can be manufactured with shallow offset regions designed to accommodate the subsequent application of the thermal insulation blankets 10. Preferably. the thermal insulating blankets 10 in the offset regions have a thickness that is substantially equal to a depth of the offset regions. Further, because the thermal insulation blankets 10 are extremely smooth, completed parts do not adhere to the casting die surface 30.

To reduce costs associated with the process, laser cladding can be used to apply the thermal insulation blankets 10 only where necessary, such as at the point of impact of the injected molten aluminum. In this manner, one or more irregularly-shaped thermal insulation blankets 10 may be applied as shown in FIG. 2. In another embodiment, a single thermal insulation layer may be applied to an entire casting die surface. In still another embodiment, a first thermal insulation layer may be applied to an entire casting die surface, while additional thermal insulation layers are applied in specific areas of the casting die surface for increased protection.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thermal insulation method for an internal surface of an injection molding casting die comprising:

selecting at least one metal material having a thermal emiflance that is approximately equal to or less than 0.25 and a melting point that is approximately equal to or greater than 1000° C;

forming a first thermal insulation layer with the at least one metal material on the internal surface using laser cladding, wherein an area of the first thermal insulation layer is substantially equal to an area of the internal surface;

determining an impact point for injection molding on the internal surface;

determining a location of the first thermal insulation layer that corresponds to the impact point; and forming a second thermal insulation layer with the at least one metal material at the corresponding location using laser cladding, wherein an area of the second thermal insulation layer is less than the area of the first thermal insulation layer.

2. The method of claim 1 further comprising forming a carbon-carbon mesh layer on the internal surface.

3. A thermal insulation method for an internal surface of an injection molding casting die comprising:

forming at least one offset region in the internal surface of the injection molding casting die;

selecting at least one metal material having a thermal emittance that is approximately equal to or less than 0.25 and a melting point that is approximately equal to or greater than 1000° C; and forming a thermal insulation layer with the at least one metal material in the at least one offset region, wherein a thickness of the first thermal insulation layer is substantially equal to a depth of the at least one offset region.

* * * * *